July 27, 1965  F. HODSON  3,196,897
PIPE COUPLING WITH COMPRESSIBLE PACKING
Filed Oct. 15, 1962

INVENTOR
FREDERICK HODSON
By Reynolds + Christensen
ATTORNEYS

United States Patent Office 3,196,897
Patented July 27, 1965

3,196,897
PIPE COUPLING WITH COMPRESSIBLE PACKING
Frederick Hodson, Douglas, Isle of Man, England, assignor, by mesne assignments, to Mannin Engineering Limited, Douglas, Isle of Man, England, a company
Filed Oct. 15, 1962, Ser. No. 230,618
Claims priority, application Great Britain, Nov. 2, 1961, 39,210/61
4 Claims. (Cl. 137—312)

This invention relates to self-sealing pipe couplings.

In this self-sealing pipe coupling, one terminal is formed with a socket and the complemental terminal as a plug. Each terminal carries a valve which is resiliently urged towards a seat in such a manner that except at times when the terminals are fully coupled together, the valve engages its seat and prevents loss of fluid from the terminal. When the terminals are fully coupled together, each valve is forced off its seat so that fluid can pass from one terminal and its pipe to the other. In some known self-sealing pipe couplings, a space of increasing volume is produced adjacent the valves as the terminals are being separated and before the valves have engaged their respective seats. Consequently fluid enters this space and leaks from the terminals when they are separated.

The present invention provides a self-sealing pipe coupling including two terminals, one formed as a socket and the other as a plug, each having a valve seat and a valve resiliently urged towards the seat, each valve engaging its seat in a sealing manner when the terminals are not fully coupled together to prevent fluid loss from the terminal, and being forced off its seat when the terminals are coupled together to allow fluid to pass from one terminal and its pipe to the other, and, differing from known couplings, the socket has a member of resilient fluid-absorbing material located adjacent the valves and which is compressed between the terminals when they are fully coupled together, but which expands into the space produced between the valves as the terminals are being separated, and which finishes expanding after the valves have closed, so as to substantially fill that space as the pipes are being uncoupled. There being substantially no space left between the valves, but little fluid can find lodgment there, and such as does is absorbed.

The resilient fluid-absorbing member may be, for example, a body of foam rubber, and a metallic spring may be embedded in the body to insure its full expansion. The socket terminal may also include a sealing ring which, when the parts are being coupled, the plug engages before it engages the resilient fluid-absorbing member. This provides a seal against leakage while any few drops of liquid that may escape past the valve into the space between valves are being absorbed by the expanding fluid-absorbing member, during uncoupling.

Figure 1:
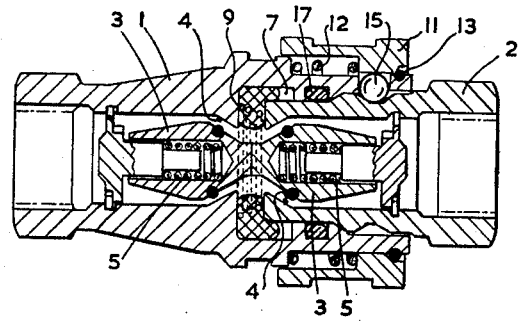

One embodiment of the present invention will now be described, by way of example, with reference to the accompanying drawing, of which, FIGURE 1 is a sectional view of a pipe coupling showing the pipes in the fully coupled position.

Figure 2:
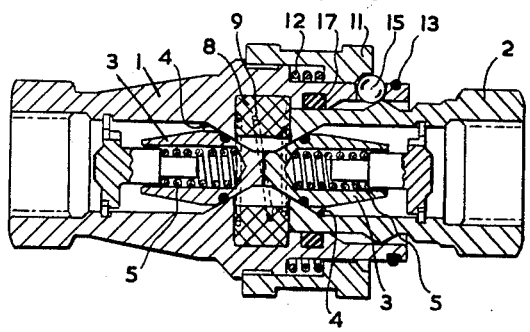
Figure 3:
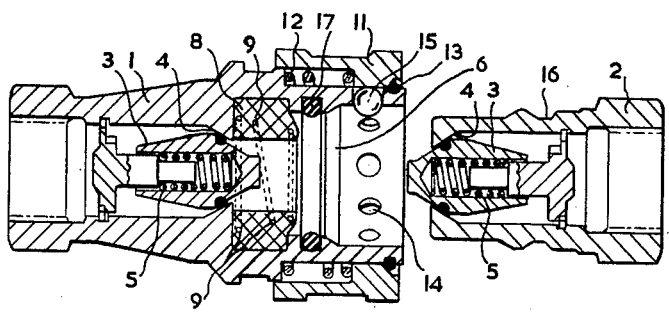

FIGURE 2 is a similar view showing the pipes as they are being coupled or uncoupled and, FIGURE 3 is a similar view showing the pipes completely uncoupled.

With reference to the accompanying drawing, a self-sealing pipe coupling includes two terminals 1, 2, each of which has a valve 3 resiliently urged towards a seat 4 by a spring 5. The terminal 1 is formed with a socket 6 into which the other terminal 2, that is the plug or spigot terminal, can enter. The valve 3 of the socket terminal 1 is located at the inner end of the socket 6. When the terminals 1, 2 are not coupled together both valves 3 are urged against their respective seats 4, as is shown in FIGURE 3, and prevent loss of fluid from the terminals 1, 2, the valve 3 of the socket terminal 1 projecting into the socket 6 and the valve 3 of the spigot terminal 2 projecting from the end of the plug terminal.

The socket terminal 1 has an annular groove 7 in its wall adjacent the inner end of the socket 6 but outwardly of the valve seat 4, and in this groove 7 is seated an annular resilient member 8 which projects radially inwardly from the groove 7. The member 8 is formed by a compressible body of resilient absorbent material, such for example as foam rubber, preferably with a spiral metallic spring 8 embedded in the body. This spring insures full expansion of member 8 during uncoupling.

The end portion of the socket terminal 1 carries a sleeve 11 which is resiliently urged towards the end of the terminal 1 by a spring 12. A circlip 13 retains the sleeve 11 on the terminal 1. The end portion of the socket terminal 1 also has a serial of apertures 14 wherein balls 15 are located. In the position shown in FIGURES 1 and 3 the sleeve 11 forces the balls 15 to project into the socket 6 but when the sleeve 11 is in the position shown in FIGURE 2, the balls 15 can be or have been forced out of the socket 6. The spigot terminal 2 has an external peripheral groove 16 in its walls for receiving the balls 15.

The socket terminal 1 has a further annual groove in the wall of the socket 6 in which is located a sealing ring 17 which engages the external surface of the end portion of the spigot terminal 2 when the terminals 1, 2 are coupled together. They first engage before terminal 2 engages member 8.

To couple the terminals 1, 2, together, the spigot terminal 12 is inserted into the socket terminal 1, with the sleeve 11 retracted in opposition to spring 12 and held in position shown in FIGURE 2. During the insertion the valves 3 engage one another as shown in FIGURE 2 and continued insertion causes the valves 3 to force one another off their seats 4 and therefore allow fluid to pass from one terminal to the other as shown in FIGURE 1. Before the valves 3 engage one another, the end of the spigot terminal 2 first enters the sealing ring 17 and then engages the member 8, and further movement compresses the latter. As the spigot terminal 2 becomes almost fully inserted into the socket terminal 1, the balls 15 become aligned with the groove 16 and movement of the sleeve 11 back to the position shown in FIGURE 1 forces the balls 15 into the groove 16 and holds the terminals 1, 2 together against accidental separation.

To uncouple the terminals 1, 2 the sleeve 11 is moved back to the position shown in FIGURE 2 to allow the balls 15 to be forced out of the groove 16 by the withdrawal of the spigot terminal 1 from the socket terminal 2. During the withdrawal, the valves 3 gradually move towards their seats 4 and at the same time the member 8, by reason of its resiliency, expands to enter the space produced between the terminals 1, 2, so as to fill at least some of that space, as shown in FIGURE 2. Therefore the amount of fluid which can leak into the space between the terminals 1, 2, as the terminals 1, 2, are being separated and before the valves 3 engage the seats 4, is small since the major part of the space becomes occupied by the member 8. Substantially all of the fluid left in the space after the valves 3 engage the seats 4, is absorbed by a further expansion of the member 8 as the separation of the terminals 1, 2 continues. The coupling is constructed so that the member 8 completes its expansion after the valves 3 engage the seats 4.

I claim as my invention:

1. A self-sealing pipe coupling comprising a socket terminal and a complemental spigot terminal each formed with a valve seat, a valve in each terminal resiliently urged towards its seat, and seating thereon when the terminals are not coupled together, to prevent loss of fluid, and being relatively of such length as to mutually engage and be forced off their respective seats when the terminals are coupled together, and a member of resilient fluid-absorbing material carried by the socket terminal intermediate the two valve seats, said member being of a thickness to be compressed between the terminals when they are coupled together, and to expand into the space between the valves as the terminals are being separated, prior to seating of the valves, and to complete its expansion after the valves have seated to absorb any fluid which may have escaped past the valve seats as the valves approach their seats.

2. A pipe coupling as in claim 1, wherein the resilient fluid-absorbing material is foam rubber.

3. A pipe coupling as in claim 1, including a metallic compression spring embedded within the fluid-absorbing member.

4. A pipe coupling as in claim 1, including a sealing ring carried by the socket terminal, in position to be engaged by the spigot terminal before the latter engages the fluid-absorbing member, during coupling.

References Cited by the Examiner

UNITED STATES PATENTS

| | | | |
|---|---|---|---|
| 285,244 | 9/83 | Farmer | 277—103 |
| 2,218,318 | 10/40 | Pfauser | 137—614.04 |
| 2,325,271 | 7/43 | Paul | 137—614.02 |
| 2,548,528 | 4/51 | Hansen | 137—614.04 XR |
| 2,688,499 | 9/54 | Hanson | 277—208 XR |

ISADOR WEIL, *Primary Examiner.*

WILLIAM F. O'DEA, *Examiner.*